(12) United States Patent
 Tillman et al.

(10) Patent No.: US 10,832,362 B1
(45) Date of Patent: *Nov. 10, 2020

(54) CASE MANAGEMENT AND DOCKETING UTILIZING PRIVATE PAIR

(71) Applicant: Nimvia, LLC, Charlotte, NC (US)

(72) Inventors: Chad Dustin Tillman, Matthews, NC (US); Jeremy Cooper Doerre, Charlotte, NC (US)

(73) Assignee: NIMVIA, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,990

(22) Filed: Nov. 19, 2018

Related U.S. Application Data

(63) Continuation of application No. 14/827,308, filed on Aug. 15, 2015, now abandoned, which is a continuation-in-part of application No. 13/837,126, filed on Mar. 15, 2013, now abandoned, which is a continuation of application No. 13/082,374, filed on Apr. 7, 2011, now abandoned, which is a continuation-in-part of application No. 12/891,785, filed on Sep. 27, 2010, now abandoned.

(60) Provisional application No. 61/246,083, filed on Sep. 25, 2009.

(51) Int. Cl.
 *G06F 16/954* (2019.01)
 *G06Q 50/18* (2012.01)

(52) U.S. Cl.
 CPC ............................... *G06Q 50/184* (2013.01)

(58) Field of Classification Search
 CPC ............................ G06Q 10/10; G06Q 10/103
 See application file for complete search history.

(56) References Cited

U.S. PATENT DOCUMENTS

| | | |
|---|---|---|
| 7,634,415 B2 | 12/2009 | Baker |
| 8,661,242 B1 | 2/2014 | Gershman et al. |
| 2002/0024540 A1 | 2/2002 | McCarthy |
| 2004/0073443 A1 | 4/2004 | Gabrick et al. |
| 2005/0210009 A1* | 9/2005 | Tran ................. G06Q 10/10 |
| 2007/0078886 A1 | 4/2007 | Rivette |
| 2007/0203737 A1 | 8/2007 | Boozer |
| 2009/0063427 A1* | 3/2009 | Zuta ................. G06F 40/247 |
| 2009/0271425 A1 | 10/2009 | Le Gall et al. |
| 2012/0191502 A1 | 7/2012 | Gross et al. |
| 2014/0365386 A1 | 12/2014 | Carstens et al. |
| 2017/0235848 A1 | 8/2017 | Van Dusen |

* cited by examiner

*Primary Examiner* — Mansour Oveissi
(74) *Attorney, Agent, or Firm* — Tillman Wright, PLLC; Chad D. Tillman; Jeremy C. Doerre

(57) ABSTRACT

Methods, systems and software include programmatically downloading over the Internet, at routine intervals of time as well as on demand, from an online computer system of the USPTO, data relating to patent properties that are associated with a customer number; and creating a docket based on the downloaded data, generating and displaying a report generated from the downloaded data, sending an alert (email or text message) that is based on the downloaded data, or any combination thereof. Data specific to a particular client also is provided to the client programmatically, with reports, alerts, docketing, or any combination thereof, further being provided for use by the client.

1 Claim, 11 Drawing Sheets

U.S. Patent & Trademark Office

Practitioner

Local Storage

CASE MANAGEMENT AND DOCKETING UTILIZING PRIVATE PAIR

CROSS-REFERENCE TO RELATED APPLICATION

The present application is a U.S. continuation patent application of, and claims priority under 35 U.S.C. § 120 to, U.S. nonprovisional patent application Ser. No. 14/827,308, filed Aug. 15, 2015, which patent application and any patents issuing therefrom are hereby incorporated by reference herein, and which '308 application is a U.S. continuation-in-part patent application of, and claims priority under 35 U.S.C. § 120 to, U.S. nonprovisional patent application Ser. No. 13/837,126, filed Mar. 15, 2013, which patent application and any patents issuing therefrom are hereby incorporated by reference herein, and which '126 application is a U.S. continuation patent application of, and claims priority under 35 U.S.C. § 120 to, U.S. nonprovisional patent application Ser. No. 13/082,374, filed Apr. 7, 2011, which patent application and any patents issuing therefrom are hereby incorporated by reference herein, and which '374 application is a U.S. continuation-in-part patent application of, and claims priority under 35 U.S.C. § 120 to, U.S. nonprovisional patent application Ser. No. 12/891,785, filed Sep. 27, 2010, which patent application and any patents issuing therefrom are hereby incorporated by reference herein, and which '785 patent application is a U.S. nonprovisional patent application of, and claims priority under 35 U.S.C. § 119(e) to, U.S. provisional patent application Ser. No. 61/246,083, filed Sep. 25, 2009, which provisional patent application is hereby incorporated by reference herein. Additionally, the disclosure of the provisional patent application is included in the Appendix attached hereto, which is hereby incorporated herein by reference.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

Computer Program Listing

Submitted via the USPTO's electronic filing system, and incorporated herein by reference, are computer program files including instructions, routines, and/or other contents of several computer program. A table setting forth the name and size of each file included in the computer program listing is included below.

| File Name | Creation Date | Size (Bytes) | Description |
| --- | --- | --- | --- |
| readme.txt | Apr. 7, 2011 12:41 | 2873 | instructions |
| ascify.txt | Apr. 7, 2011 12:41 | 37473 | assembly source code |
| A-ZIP.TXT | Apr. 7, 2011 20:52 | 992660 | compressed source code |
| B-ZIP.TXT | Apr. 7, 2011 20:52 | 1005121 | compressed source code |
| C-ZIP.TXT | Apr. 7, 2011 20:52 | 501295 | compressed source code |
| CHILL-ZI.TXT | Apr. 7, 2011 20:52 | 3256350 | compressed source code |
| D-ZIP.TXT | Apr. 7, 2011 20:52 | 524630 | compressed source code |
| E-ZIP.TXT | Apr. 7, 2011 20:52 | 310492 | compressed source code |
| F-ZIP.TXT | Apr. 7, 2011 20:52 | 75363 | compressed source code |
| G-ZIP.TXT | Apr. 7, 2011 20:52 | 3464 | compressed source code |
| H-ZIP.TXT | Apr. 7, 2011 20:52 | 1355096 | compressed source code |
| I-ZIP.TXT | Apr. 7, 2011 20:52 | 1354560 | compressed source code |
| J-ZIP.TXT | Apr. 7, 2011 20:52 | 5561420 | compressed source code |
| K-ZIP.TXT | Apr. 7, 2011 20:52 | 443975 | compressed source code |
| L-ZIP.TXT | Apr. 7, 2011 20:52 | 444849 | compressed source code |
| M-ZIP.TXT | Apr. 7, 2011 22:05 | 3339682 | compressed source code |
| MAIN-ZIP.TXT | Apr. 7, 2011 20:52 | 233393 | compressed source code |
| N-ZIP.TXT | Apr. 7, 2011 20:52 | 4738863 | compressed source code |
| O-ZIP.TXT | Apr. 7, 2011 22:05 | 6307695 | compressed source code |
| P-ZIP.TXT | Apr. 7, 2011 20:52 | 4657361 | compressed source code |
| Q-ZIP.TXT | Apr. 7, 2011 20:52 | 164245 | compressed source code |
| R-ZIP.TXT | Apr. 7, 2011 20:52 | 164121 | compressed source code |
| S-ZIP.TXT | Apr. 7, 2011 20:52 | 165571 | compressed source code |
| T-ZIP.TXT | Apr. 7, 2011 20:52 | 171593 | compressed source code |
| U-ZIP.TXT | Apr. 7, 2011 20:52 | 171598 | compressed source code |
| W-ZIP.TXT | Apr. 7, 2011 22:05 | 4227488 | compressed source code |
| WORD-ZIP.TXT | Apr. 7, 2011 20:52 | 1935378 | compressed source code |
| X-ZIP.TXT | Apr. 7, 2011 20:52 | 71268 | compressed source code |
| Y-ZIP.TXT | Apr. 7, 2011 22:05 | 3736841 | compressed source code |
| Z-ZIP.TXT | Apr. 7, 2011 20:52 | 5341496 | compressed source code |
| Constants-cs.txt | Mar. 9, 2011 13:59 | 968 | data engine source code |
| MainGUI-cs-.txt | Apr. 6, 2011 16:51 | 11135 | data engine source code |
| MainGUI-Designer-cs.txt | Apr. 6, 2011 16:41 | 14900 | data engine source code |
| Program-cs.txt | Mar. 9, 2011 14:10 | 831 | data engine source code |
| Task-cs.txt | Mar. 9, 2011 14:00 | 675 | data engine source code |
| XMLDownload-cs.txt | Apr. 6, 2011 16:31 | 7767 | data engine source code |
| readme2.txt | Sept. 27, 2010 16:34 | 2,873 | Instructions |
| access0.txt | Sept. 27, 2010 13:34 | 7570823 | PAIR Access Base Folder |
| access1.txt | Sept. 27, 2010 13:35 | 19667506 | PAIR Access Subfolder(s) |
| access2.txt | Sept. 27, 2010 13:35 | 18626773 | PAIR Access Subfolder(s) |
| access3.txt | Sept. 27, 2010 13:35 | 22779941 | PAIR Access Subfolder(s) |
| access4.txt | Sept. 27, 2010 13:36 | 23838300 | PAIR Access Subfolder(s) |
| inine0.txt | Sept. 27, 2010 13:53 | 22623687 | Insight 2k9 Base Folder |

-continued

| File Name | Creation Date | Size (Bytes) | Description |
| --- | --- | --- | --- |
| inine1 .txt | Sept. 27, 2010 13:54 | 8006867 | Insight 2k9 Subfolder(s) |
| iten0.txt | Sept. 27, 2010 14:57 | 24755143 | Insight 2k10 Base Folder |
| itenl.txt | Sept. 27, 2010 14:58 | 7827859 | Insight 2k10 Subfolder(s) |
| rep0.txt | Sept. 27, 2010 15:12 | 24816888 | Patent Reporter Base Folder |
| rep1.txt | Sept. 27, 2010 15:12 | 1241978 | Patent Reporter Subfolder(s) |
| s10.txt | Sept. 27, 2010 15:28 | 392798 | Searchlight Base Folder |
| s11.txt | Sept. 27, 2010 15:29 | 19499509 | Searchlight Subfolder(s) |
| s12.txt | Sept. 27, 2010 15:29 | 21703815 | Searchlight Subfolder(s) |
| s13.txt | Sept. 27, 2010 15:29 | 22166347 | Searchlight Subfolder(s) |
| s14.txt | Sept. 27, 2010 15:29 | 17591950 | Searchlight Subfolder(s) |
| s15.txt | Sept. 27, 2010 15:30 | 15367118 | Searchlight Subfolder(s) |
| s16.txt | Sept. 27, 2010 15:30 | 25379710 | Searchlight Subfolder(s) |
| s17.txt | Sept. 27, 2010 15:30 | 13509785 | Searchlight Subfolder(s) |
| s18.txt | Sept. 27, 2010 15:30 | 13506758 | Searchlight Subfolder(s) |

Two of these files, "readme.txt" and "readme2.txt", contain instructions for utilizing another of the files "ascify.txt" to extract information from other of the files. These other files are compressed binary files that have been converted to ascii format. These files can be converted back to binary format utilizing an assembly conversion program source code for which is contained in "ascify.txt". The readme files include instructions for compiling and running this conversion program, as well as instructions for converting the other text files to compressed, binary files. The compressed, binary files include source code.

Several files are uncompressed text files that include source code for a data engine configured to automatically download data.

The source code in these files, and the compressed text files, is written in C Sharp and can be compiled utilizing Microsoft Visual Studio 2008. The target environment for implementations utilizing such source code is 32-bit or 64-bit Windows XP, Vista, or 7.

BACKGROUND OF THE INVENTION

The present invention generally relates to patent case management and docketing.

There exist many systems and methods for managing intellectual property data. For example, USPA Pub. No. 2005/0210009 to Tran discloses systems and methods for providing an electronic file for intellectual property applications by receiving electronic file wrapper information from a patent office; and generating a single electronic document for an entry in the electronic file wrapper information, the document having all images for the entry consolidated therein.

The current state-of-the-art for patent case management and docketing fails to realize the full potential of Private PAIR and the XML data that is made available by the U.S. Patent & Trademark Office (USPTO) to patent practitioners for download.

Current practices primarily rely on the physical docketing of USPTO correspondence that is received by practitioners via the U.S. Post Office. Typically, one or more docket clerks open and review the USPTO correspondence, and then make manual data entries in a docket program for creating and tracking deadlines that may be associated with the USPTO correspondence. Sometimes this function is outsourced to a third party service provider.

At single-practitioner firms and some smaller firms, the manual data entry may be performed by the practitioner himself or herself. Moreover, the data may not even be entered into a docketing program, but instead in a general purpose calendar program or spreadsheet that is not specifically designed to address any particular patent case management and patent docketing needs.

The manual data entry that is performed in these conventional practices is generally duplicative of the data entry that has already been performed by the USPTO. In this regard, application data, including USPTO correspondence data, is already maintained in electronic form by the USPTO and access to this data, via XML file downloads, is provided to patent practitioners by the USPTO in Private PAIR.

Accordingly, a need exists for improvement in patent case management and docketing and, specifically, a need exists for making use of the XML data that is provided by the USPTO to patent practitioners in patent case management and docketing. This, and other needs, are addressed by one or more embodiments of the invention.

SUMMARY OF THE INVENTION

The present invention includes many aspects and features. Moreover, while many aspects and features relate to, and are described in, the context of patent case management and docketing based on data downloaded from the USPTO, the present invention is not limited to use only in connection with the USPTO, and it is contemplated that broad aspects of the invention encompass uses in connection with data that may be available for download from other patent offices, including the European Patent Office.

Accordingly, in accordance with an aspect of the invention, a computer-readable medium contains computer-executable instructions that, when executed by a computer, perform a method comprising the steps of: downloading, from an online computer system of the USPTO, data relating to patent properties that are associated with a customer number; and creating a docket based on the downloaded data.

In a feature, the method is performed on a computer of a patent practitioner or a law firm.

In a feature, the data that is downloaded is saved to local storage for later access.

In a feature, the data that is downloaded is saved to cloud storage for later access.

In a feature, the method further performs a step of determining whether data has been previously downloaded for the day and no download is performed is data has already been downloaded. The method may perform the step of downloading the data from a cloud server if the determination is made that data has been previously been downloaded for the day.

In a feature, the method further comprises accessing the online computer system of the USPTO using a PKI digital certificate, and downloading an XML file containing application data for each customer number with which the PKI digital certificate is associated. Each of the steps of the method are programmatically performed, and may performed on a routine basis automatically without manual input from a user. Steps (a) and (b) further may be performed on demand by a user under the direction and control of a patent practitioner. Furthermore, each of the steps (a) and (b) may be are performed after expiration of a predetermined period of time; and each of the steps (a) and (b) may be programmatically performed at a particular time of day or within a particular window of time on one or more predetermined days.

In a feature, following step (a), the data that is downloaded is processed.

In a feature, following step (a), the data that is downloaded is consolidated into an initial dataset, and the method further comprises: saving modifications to the initial dataset separately from the initial data set, whereby the initial dataset itself is unchanged; and constructing a working dataset by applying saved modifications to the initial dataset. The saved modifications may be modifications made by a docket clerk, by a patent practitioner, or both in which case the modifications made by the docket clerk are applied before the modifications made by the patent practitioner are applied. The method further may comprise the steps of creating a dataset comprising data for a particular client of the patent practitioner, and saving the client dataset to a cloud location for later access by the client.

In accordance with an aspect of the invention, a method comprises the steps of: (a) downloading, from an online computer system of the USPTO, data relating to patent properties that are associated with a customer number; and (b) creating a docket based on the downloaded data; (c) wherein said steps (a) and (b) are performed programmatically by a program that is executed on a computer.

In accordance with an aspect of the invention, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) creates a docket based on the downloaded data.

In accordance with an aspect of the invention, a computer-readable medium contains computer-executable instructions that, when executed by a computer, perform a method comprising the steps of: (a) downloading, from an online computer system of the USPTO, data relating to patent properties that are associated with a customer number; and (b) generating and displays a report based on the downloaded data.

In a feature, following step (a), the data that is downloaded is consolidated into an initial dataset from which the report is generated. The method further may include saving modifications to the initial dataset separately from the initial data set, and constructing a working dataset by applying saved modifications to the initial dataset whereby the initial dataset itself is unchanged, in which case the report that is generated includes the modifications.

In another aspect, a method comprises the steps of: (a) downloading, from an online computer system of the USPTO, data relating to patent properties that are associated with a customer number; and (b) generating and displays a report based on the downloaded data; (c) wherein said steps (a) and (b) are performed programmatically by a program that is executed on a computer.

In another aspect, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) generating and displays a report based on the downloaded data.

In another aspect, a computer-readable medium contains computer-executable instructions that, when executed by a computer, perform a method comprising the steps of: (a) downloading, from an online computer system of the USPTO, data relating to patent properties that are associated with a customer number; and (b) sending an email alert based on the downloaded data.

In a feature, following step (a), the data that is downloaded is consolidated into an initial dataset on which the email alert is based. The method further may include saving modifications to the initial dataset separately from the initial data set, and constructing a working dataset by applying saved modifications to the initial dataset whereby the initial dataset itself is unchanged, in which case the email alert is based on the initial dataset including the modifications applied thereto.

In accordance with an aspect of the invention, a method comprises the steps of: (a) downloading, from an online computer system of the USPTO, data relating to patent properties that are associated with a customer number; and (b) sending an email alert based on the downloaded data; (c) wherein said steps (a) and (b) are performed programmatically by a program that is executed on a computer.

In accordance with an aspect of the invention, a system comprises: (a) a computer connected to the Internet; and (b) a program run by the computer; (c) wherein the computer, in accordance with the program being run, (i) programmatically downloads at routine intervals of time, from an online computer system of the USPTO, data relating to patent properties that are associated with a customer number; and (ii) sends an email alert based on the downloaded data when a precondition is met.

In a feature, the precondition comprises any new updates to status or transaction information for at least one of the patent properties for which data is downloaded.

In a feature, the email alert includes a report listing the updates.

In another aspect, a computer-readable medium contains computer-executable instructions that, when executed by a computer, perform a method comprising the steps of: (a) downloading, from an online computer system of the USPTO, data relating to patent properties that are associated with a customer number; and (b) sending a text message to a mobile phone based on the downloaded data.

In another aspect, a computer-readable medium contains computer-executable instructions that, when executed by a computer, perform a method comprising the steps of: (a) downloading, from a first cloud, first patent data relating to patent properties of a person or legal entity that are associated with a first customer number; (b) downloading, from a second cloud, second patent data relating to patent properties of the same person or legal entity that are associated with a second customer number; and (c) generating and displaying a consolidated report to the person or legal entity based on the first patent data and second patent data.

In a feature, the first cloud and the second cloud are the same. Alternatively, the first cloud and the second cloud are different.

In a feature of this aspect, the first customer number is associated with a first law firm and the second customer number is associated with a second, different law firm, and the first patent data and the second patent data both contain data on patent properties that are assigned to or under obligation of assignment to the person or entity.

In a feature, step (a) includes downloading the first patent data to a computer of the person or entity, step (b) includes downloading the second patent data to the same computer of the person or entity, and the consolidated report is generated and displayed on a display connected to the computer of the person or entity.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
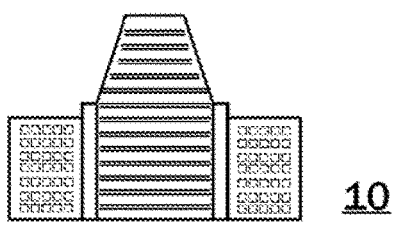
FIG. 1 is a schematic illustration of a system architecture in which information about patent properties is acquired electronically from the USPTO by a patent practitioner using a computer, which may include a desktop pc, laptop, or server of the practitioner, and then electronically saved to local data storage of the practitioner.
Figure 1:
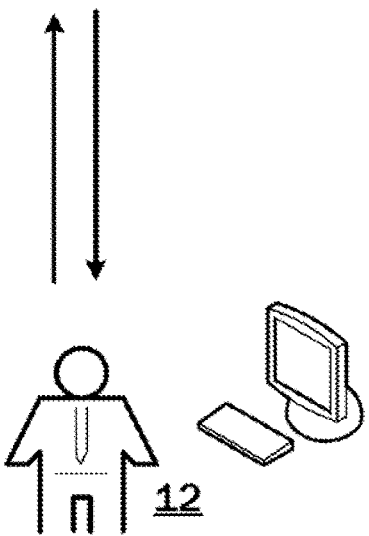
Figure 1:
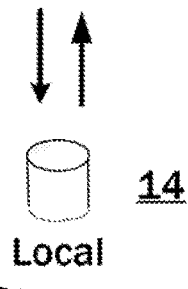

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Customer Numbers and PM Digital Certificate

The U.S. Patent & Trademark Office (USPTO) maintains information about patent properties—including both patent applications and patents—in electronic form. Furthermore, the USPTO is now maintaining the official file records of current patent applications in electronic form.

In connection with this, the USPTO now makes data regarding patent properties electronically accessible to the public via Public PAIR, and electronically accessible to patent practitioners via Private PAIR. Both Public PAIR and Private PAIR are available and widely accessible over the Internet. Moreover, the data that is now accessible to a particular patent practitioner via Private PAIR includes not only information that is available via Public PAIR, but also information about patent properties for which that patent practitioner is responsible and which is not yet publicly available. The USPTO accomplishes this using customer numbers and PKI digital certificates.

In particular, a customer number is a five or six digital number that uniquely identifies: a person or legal entity; correspondence address for such entity; and a list of one or more patent practitioners, each practitioner being identified by his or her respective U.S. registration number. The USPTO electronically maintains the customer number information for each customer number.

The USPTO generally will issue a customer number in response to a request from a patent practitioner. A law firm is not limited to having a single customer number and may have more than one customer number. For instance, a law firm may request an additional customer number to be used in connection with all patent properties for a particular client of the law firm.

The customer number facilitates the identification of a correspondence address for patent properties as well as identification of those patent practitioners who can legally represent a patent applicant before the USPTO. Specifically, a customer number usually is identified in connection with the correspondence address for a patent property, and the customer number usually is identified in connection with a power of attorney in a patent property. Upon such identification in connection with the correspondence address, the USPTO thereafter associates the particular patent property with the identified customer number.

A PKI digital certificate is issued by the USPTO to a patent practitioner upon request. The USPTO maintains an association between each PKI digital certificate and the patent practitioner to which the PKI digital certificate is issued. The PKI digital certificate is used to authenticate a patent practitioner to the USPTO when accessing Private PAIR over the Internet.

Based on the associations maintained by the USPTO of: customer numbers with patent properties; patent practitioners with customer numbers; and PKI digital certificates with patent practitioners, a patent practitioner who has been issued a PKI digital certificate generally is able to access information via Private PAIR for all patent properties associated with customer numbers that include that patent practitioner's registration number. Such access includes the ability to view information online about those patent properties as well as the ability to download XML files that include data about those patent properties. Moreover, the data is available for download on a customer number by customer number basis. Thus, for example, an XML file download is available for each customer number with which the patent practitioner is associated.

A First System Architecture

One or more preferred embodiments of the present invention are now described in connection with FIGS. 1-1b.

Figure 1A:
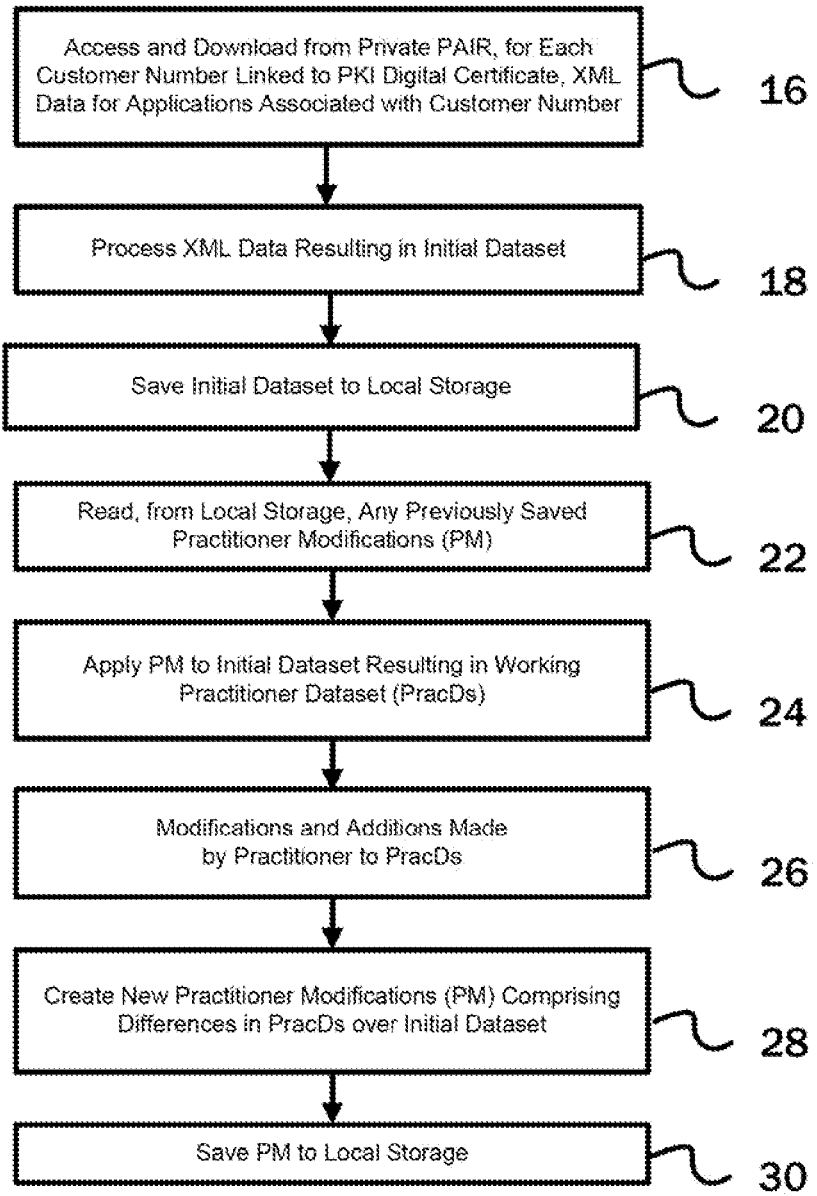
FIGS. 1a-b are flowcharts illustrating steps of one or more preferred embodiments in accordance with this first system architecture of FIG. 1.
Figure 1B:
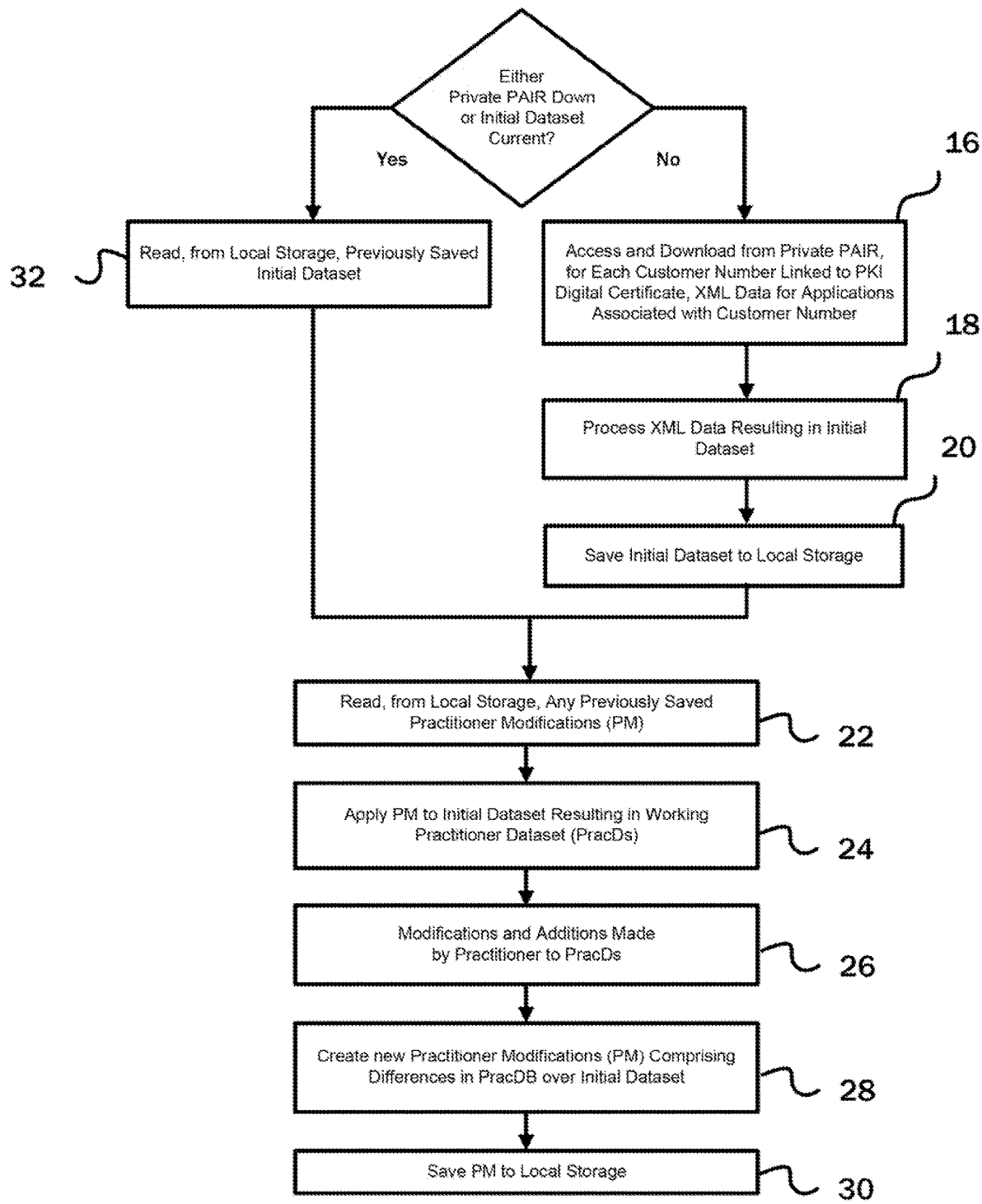

FIG. 1 is a schematic illustration of a system architecture in which information about patent properties is acquired electronically from the USPTO 10 by a patent practitioner 12 using a computer, which may include a desktop pc, laptop, or server of the practitioner, and then electronically saved to local data storage 14 of the practitioner. FIG. 1a is a flowchart illustrating steps of one or more preferred embodiments in accordance with this first system architecture.

Specifically, the patent practitioner accesses, via the Internet, Private PAIR and downloads 16 from the USPTO, for each customer number with which the patent practitioner is associated, the XML data for all of the patent properties associated with that customer number. Such data conventionally may be manually downloaded by navigating to the customer number filter in Private PAIR, selecting a desired customer number, and then selecting the orange "XML" button. However, in accordance with preferred embodiments, the downloading is programmatically performed on demand, automatically at a scheduled time, or automatically after a predetermined period of time has elapsed.

Optionally, detailed XML data may be separately downloaded for each of one or more specific patent properties for purposes of supplementing the information about such patent property that is contained in the customer number download. Such a download includes detailed information that is not included in the general customer number download, such as a history of transactions and outgoing correspondence for the specific patent property, and title and continuity information of the specific patent property. This information can be important, for example, in better calculating deadlines when docketing. The detailed XML data conventionally may be manually downloaded by navigating to the Application Data tab for the particular patent property in Private PAIR and then selecting the orange "XML" button. However, in accordance with one or more preferred embodiments, the downloading is programmatically performed when certain conditions are met that indicate such detailed information is needed.

Once the download customer number XML data is complete, the XML data from the downloaded files is processed 18 resulting in an initial dataset comprising a plurality of data tables. During the processing, the data from each of the downloaded XML files is reformatted and consolidated together. The data tables include an Application Data Table in which primary information about patent properties is stored; a Status and Transaction Data Table in which status and transaction data is stored; and a Correspondence Data Table in which outgoing correspondence information sent by the USPTO in connection with the patent properties is stored. The initial dataset is in the form of an in-memory dataset and is saved as one or more XML files. The initial dataset is saved 20 to local storage, such as on a hard disk drive, flash drive, or other local storage.

It will be appreciated that, rather than use in-memory datasets, one or more databases may be used. For example, objects may be used instead of data tables, and the objects may be stored, accessed, and manipulated using a database management system such as DB4O.

Also during processing, additional data may be derived from the data that has been downloaded from the USPTO and saved, including deadlines that may be calculated from the downloaded data. The derived data may be included in one or more data tables of the initial dataset. For instance, reminders regarding deadlines can be derived from the downloaded data and then saved in a reminders data table of the initial dataset.

Provided there are no previous modifications or additions by the practitioner that need to be accounted for (thus permitting steps 22 and 24 to be skipped in FIG. 1a), the initial dataset is used to generate and display reports to the patent practitioner; to generate and send alerts and reports via email to the patent practitioner, or other desired recipients; and to instantiate a docket of the patent practitioner. Additionally, the data may be filtered when generating reports, alerts or instantiating a docket so that only those patent properties of particular interest are included. Alternatively, such filtering may be performed when the initial dataset is created.

On the other hand, there may be modifications or additions to the data of the initial dataset. In this respect, the practitioner may desire to modify the data in the initial dataset after downloading—including updating, revising, and omitting data—or may desire to add data for use in reports, alerts, and docketing, such as data for new matters that are not reflected in the data downloaded from the USPTO. The patent practitioner is able to modify and add 26 data via different graphical user interfaces, including the ability to add matters and to add reminders for specific matters. The modifications and additions are made to the in-memory dataset representing the initial dataset. The resulting in-memory dataset constitutes a working practitioner dataset (PracDs), and the reports, alerts, and docket are all generated based on the PracDs rather than the initial dataset.

A practitioner modifications (PM) dataset is created 28 in which the net modifications and additions to the initial dataset are maintained. The net modifications and additions comprise the differences in the PracDs over the initial dataset. The PM is saved 30 to the local storage separate and apart from the initial dataset. The initial dataset is thereby maintained in a pristine form based on the XML data that is acquired from the USPTO, and is not altered by any modifications or additions that are be made by the practitioner.

Furthermore, when net modifications and additions have previously been saved to local storage, the net modifications and changes are read from the local storage 20 and applied 22 to the resulting initial dataset that is created following the download in order to create the PracDs for use in reports, alerts and docketing. Thus, steps 22 and 24 are not skipped. Instead, the PracDs is constructed each time XML data is downloaded from the USPTO by applying the PM to the initial dataset.

It is believed that the data that is available for download via Private PAIR is updated daily, and that only one download per day is necessary. Consequently, it will be appreciated that if the XML data has been downloaded for the day, and if the PracDs needs to be constructed for reports, alerts and docketing, then the PracDs can be constructed by reading 32 the previously saved initial dataset from local storage without accessing Private PAIR and downloading the XML data from the USPTO. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the initial dataset created from the XML data that has already been downloaded for that particular day is read from local storage for constructing the PracDs.

The check may include maintaining a timestamp for each XML download associated with a customer number and deeming any download occurring after a preset time as having obtained, for that day and for that customer number, the most recent XML data available for that customer number.

The ability to construct the PracDs from the initial dataset after the XML data has been downloaded from the USPTO on a particular day can be particularly beneficial, as the downloading of the XML data from the USPTO may take an appreciable amount of time that may be noticeable to a user seeking to work with and waiting for the PracDs to be constructed. Additionally, if Private PAIR is down or otherwise unavailable, the PracDs still can be constructed for reports, alerts and docketing by using the most recently saved initial database and PM. This ability to read and construct the PracDs from local storage under such scenarios is reflected in the flowchart of FIG. 1b.

Software Implementations in Accordance with the First System Architecture

Software implementations in accordance with the first system architecture of FIG. 1 are included in the computer program listing of the present application, which is incorporated by reference herein. Such software implementations include the PAIR Insight™ 2009 program; the PAIR Insight™ 2010 program; and the Pair Access™ program.

A Second System Architecture

One or more preferred embodiments of the present invention are now described in connection with FIGS. 2-2a.

Figure 2:
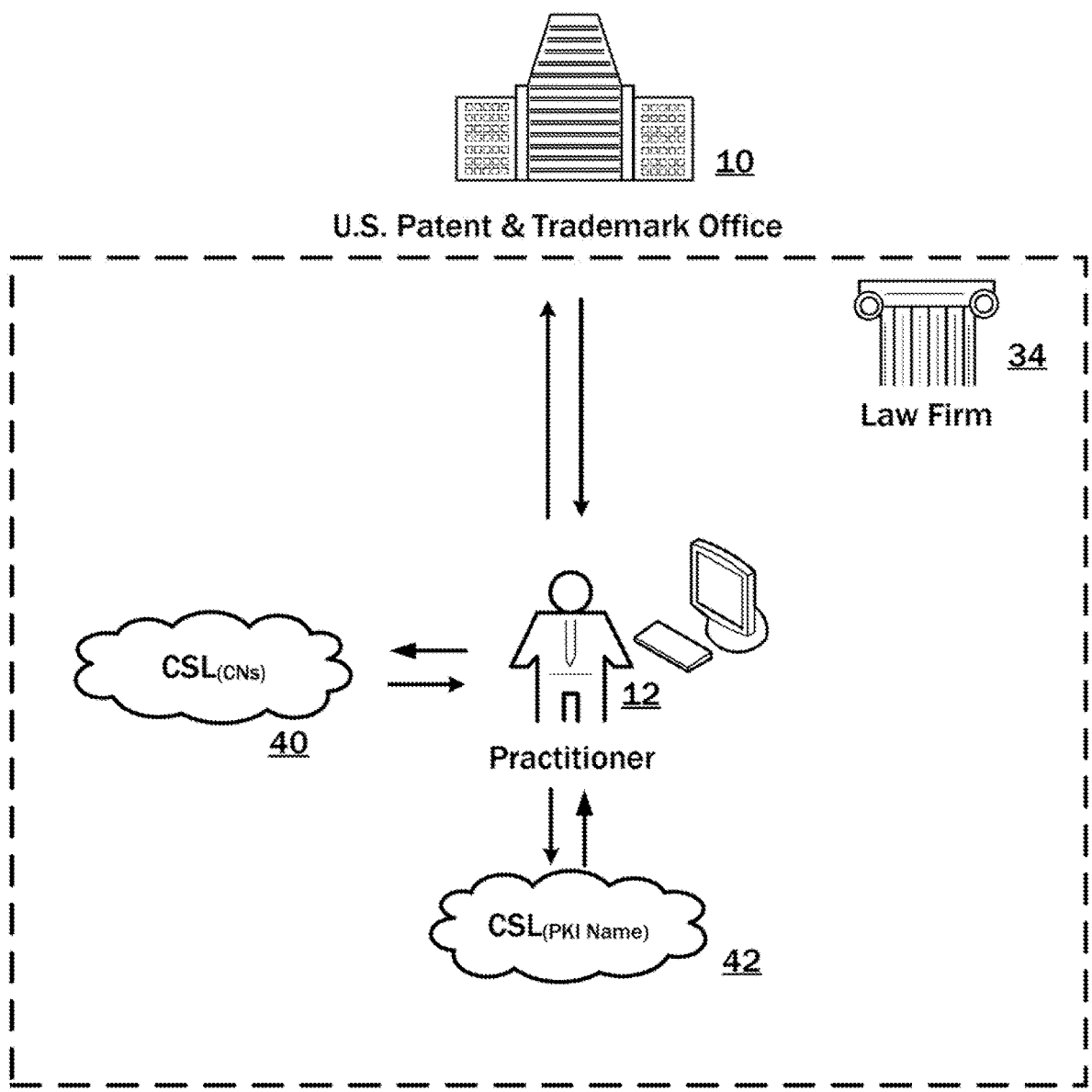
FIG. 2 is a schematic illustration of another system architecture.
Figure 2A:
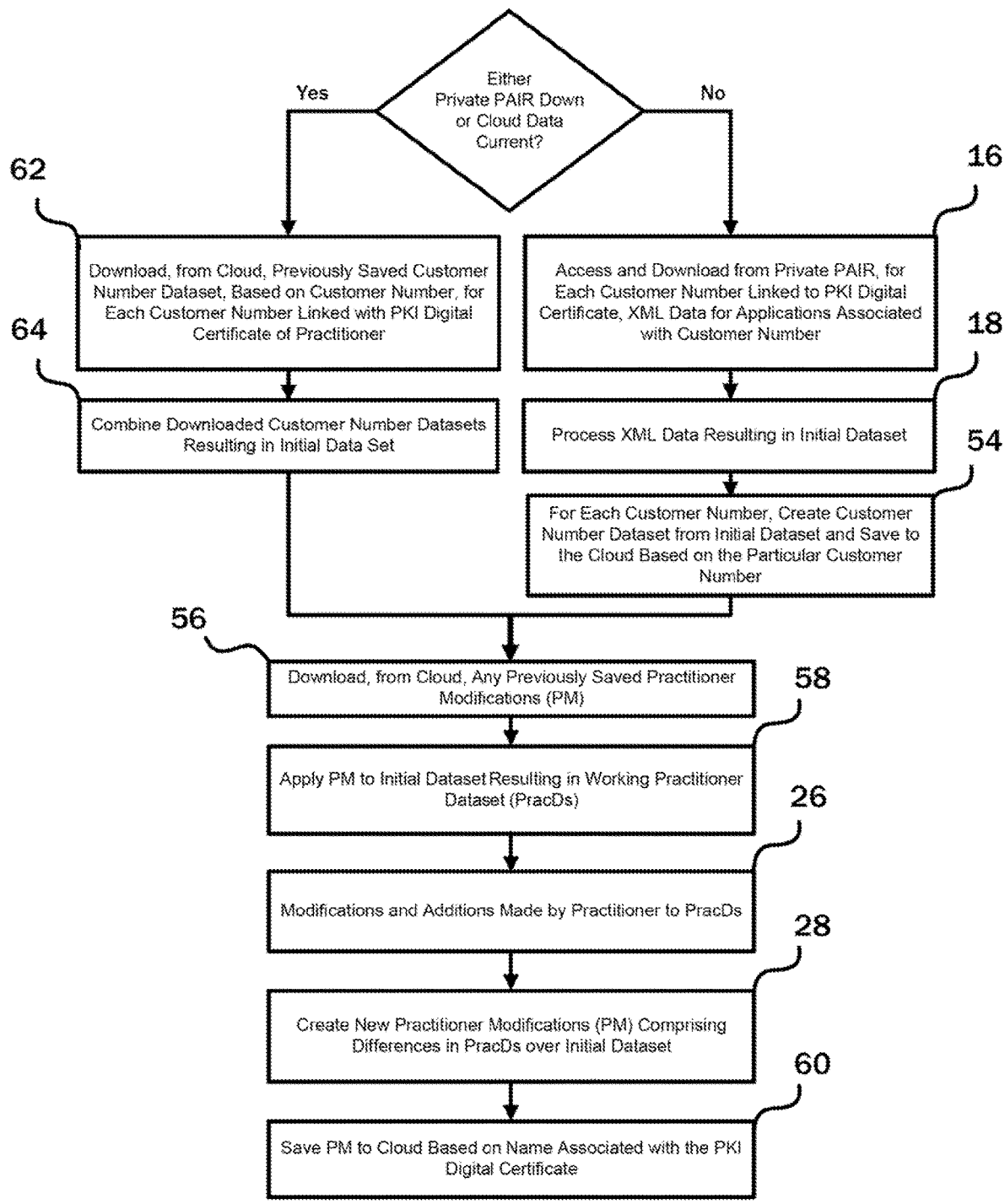
FIG. 2a is a flowchart illustrating steps of one or more preferred embodiments in accordance with the system architecture of FIG. 2.

FIG. 2 is a schematic illustration of another system architecture and FIG. 2a is a flowchart illustrating steps of one or more preferred embodiments in accordance with this system architecture.

In the system architecture of FIG. 2, information about patent properties is acquired electronically from the USPTO 10 by a patent practitioner 12 at law firm 34 using a computer, which may include a desktop pc, laptop, or server of the practitioner, and then electronically saved to a cloud storage location (CSL). Cloud storage locations are readily available as a service provided by such companies as, for example, Rackspace US, Inc. and EMC Corporation. Data may be uploaded and downloaded by any of several different protocols, as will be understood by the Ordinary Artisan. A protocol that has been found suitable in terms of speed and security is the secure file transfer protocol (SFTP). Another protocol found to be suitable is the secure hypertext transfer protocol (HTTPS). Furthermore, a combination of different protocols may be used including, for example, FTPS for uploading to a cloud storage location and HTTPS for downloading from a cloud storage location.

In one or more preferred embodiments, the cloud storage location utilizes an FPT server and includes first cloud storage that is indexed by customer numbers, indicated at 40 as $CSL_{(CNs)}$; and second cloud storage that is indexed by the name associated with the PKI digital certificate being used, indicated at 42 as $CSL_{(PKI\ Name)}$. When viewed via an FTP client program, the directory structure includes a folder titled "cns", in which are contained folders bearing titles corresponding to customer numbers. Each of these folders includes data pertaining to the customer number represented by that folder. In this way, data associated with a customer number can be accessed by simply accessing the data in the folder corresponding to the respective customer number. Similarly, the directory structure further includes a folder titled "practitioner", in which are contained folders bearing titles corresponding to practitioner names associated with PKI digital certificates. Each of these folders includes data pertaining to the practitioner whose PKI digital certificate is used, and data associated with a particular practitioner can be accessed by simply accessing the data in the folder corresponding to that practitioner.

The PKI name preferably is the name that is literally identified when the PKI digital certificate is read as a text file. It is believed that the PKI name uniquely identifies a patent practitioner. It will be appreciated by the Ordinary Artisan that, to the extent that the PKI name is not unique, then another unique identifier should be used in its place that represents a single patent practitioner to which the PKI digital certificate is issued by the USPTO. Such a unique identifier could be issued by a third party service provider who may provide, for example, the cloud storage location, the software for accessing the cloud location for uploading and downloading, or both.

With reference to FIG. 2a, the patent practitioner accesses, via the Internet, Private PAIR and downloads 16 from the USPTO, for each customer number with which the patent practitioner is associated, the XML data for all of the patent properties associated with that customer number. Such data conventionally may be manually downloaded by navigating to the customer number filter in Private PAIR, selecting a desired customer number, and then selecting the orange "XML" button. However, in accordance with preferred embodiments, the downloading is programmatically performed on demand, automatically at a scheduled time, or automatically after a predetermined period of time has elapsed. The download occurs if the XML data has not yet been downloaded for the day and the XML data is needed. It is believed that the data that is available for download via Private PAIR is updated daily, and that only one download per day is necessary.

Optionally, detailed XML data may be separately downloaded for each of one or more specific patent properties for purposes of supplementing the information about such patent property that is contained in the customer number download. Such a download includes detailed information that is not included in the general customer number download, such as a history of transactions and outgoing correspondence for the specific patent property, and title and continuity information of the specific patent property. This information can be important, for example, in better calculating deadlines when docketing. Such detailed XML information conventionally may be manually downloaded by navigating to the Application Data tab for the particular patent property in Private PAIR and then selecting the orange "XML" button. However, in accordance with one or more preferred embodiments, the downloading is programmatically performed when certain conditions are met that indicate such detailed information is needed.

Once the download of the customer number XML data is complete, the XML data from the downloaded files is processed 18 resulting in an initial dataset comprising a plurality of data tables. During the processing, the data from each of the downloaded XML files is reformatted and consolidated together. The data tables include an Application Data Table in which primary information about patent properties is stored; a Status and Transaction Data Table in which status and transaction data is stored; and a Correspondence Data Table in which outgoing correspondence information sent by the USPTO in connection with the patent properties is stored. The initial dataset is in the form of an in-memory dataset; however, it will be appreciated that, rather than use in-memory datasets, one or more databases may be used. For example, objects may be used instead of data tables, and the objects may be stored, accessed, and manipulated using a database management system such as DB4O.

Also during processing, additional data may be derived from the data that has been downloaded from the USPTO and saved, including deadlines that may be calculated from the downloaded data. The derived data may be included in one or more data tables of the initial dataset. For instance, reminders regarding deadlines can be derived from the downloaded data and then saved in a reminders data table of the initial dataset.

The initial dataset is saved 54 by creating, for each customer number, a customer number dataset representing a subset of the initial dataset that includes all of the data associated with the patent properties associated with the particular customer number. Each customer number dataset then is saved to the cloud storage location and, in particular, to the first cloud storage $CSL_{(csn)}$ in the folder that corresponds to the particular customer number of the customer number dataset. Any currently existing customer number dataset in the first cloud storage may be overwritten during the save operation.

Provided there are no previous modifications or additions by the practitioner that need to be accounted for (thus permitting steps 56 and 58 to be skipped in FIG. 2a), the initial dataset is used to generate and display reports to the patent practitioner; to generate and send alerts and reports via email to the patent practitioner, or other desired recipients; and to instantiate a docket of the patent practitioner. Additionally, the data may be filtered when generating reports, alerts or instantiating a docket so that only those patent properties of particular interest are included. Alternatively, such filtering may be performed when the initial dataset is created.

On the other hand, there may be modifications or additions to the data of the initial dataset. In this respect, the practitioner may desire to modify the data in the initial dataset after downloading—including updating, revising, and omitting data—or may desire to add data for use in reports, alerts, and docketing, such as data for new matters that are not reflected in the data downloaded from the USPTO. The patent practitioner is able to modify and add 26 data via different graphical user interfaces, including the ability to add matters and to add reminders for specific matters. The modifications and additions are made to the in-memory dataset representing the initial dataset. The resulting in-memory dataset constitutes a working practitioner dataset (PracDs), and the reports, alerts, and docket are all generated based on the PracDs rather than the initial dataset.

A practitioner modifications (PM) dataset is created 28 in which the net modifications and additions to the initial dataset are maintained. The net modifications and additions comprise the differences in the PracDs over the initial dataset. The PM is saved 60 to the cloud storage location and, in particular, to the second cloud storage $CSL_{(PKI\ Name)}$ in the folder that corresponds to the particular practitioner name of the PKI digital certificate being used. Any currently existing PM in the second cloud storage may be overwritten during the save operation.

It will be appreciated that the initial dataset is thereby maintained in a pristine form based on the XML data that is acquired from the USPTO, and the initial dataset is not altered by any modifications or additions that are be made by the practitioner.

Furthermore, it will be appreciated that when net modifications and additions have previously been saved to the second cloud storage, the net modifications and changes are downloaded 56 from the second cloud storage and applied 58 to the initial dataset that is created following the download of the XML data in order to create the PracDs for use in reports, alerts and docketing. Thus, steps 56 and 58 are not skipped. Instead, the PracDs is constructed each time XML data is downloaded from the USPTO by applying any previously saved PM to the initial dataset.

It is believed that the data that is available for download via Private PAIR is updated daily, and that only one download per day is necessary. Consequently, it will be appreciated that if the XML data has been downloaded for the day, and if the PracDs needs to be constructed for reports, alerts and docketing, then the PracDs can be constructed by downloading 62 the previously saved customer number datasets from the first cloud storage and combining 64 them to form the initial dataset, thereby avoiding any need to access Private PAIR and again download the XML data from the USPTO for all of the customer numbers. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the customer number datasets already created from the XML data that has been downloaded for that particular day is read from the first cloud storage for constructing the PracDs.

The check may include maintaining a timestamp for each XML download associated with a customer number and deeming any download occurring after a preset time as having obtained, for that day and for that customer number, the most recent XML data available for that customer number.

The ability to construct the PracDs from the customer number datasets after the XML data has been downloaded from the USPTO on a particular day can be particularly beneficial, as the downloading of the XML data from the USPTO may take an appreciable amount of time that may be noticeable to a user seeking to work with and waiting for the PracDs to be constructed. Additionally, if Private PAIR is down or otherwise unavailable, the PracDs still can be constructed for reports, alerts and docketing by using the most recently saved customer number datasets and PM. This ability to read and construct the PracDs from the data saved to the cloud storage location under such scenarios is reflected in the flowchart of FIG. 2a.

Software Implementations in Accordance with the Second System Architecture

A software implementation in accordance with the second system architecture of FIG. 2 is included in the computer program listing of the present application, which is incorporated by reference herein. Such software implementation comprises the Searchlight program.

A Third System Architecture

One or more preferred embodiments of the present invention are now described in connection with FIGS. 3-3a.

Figure 3:
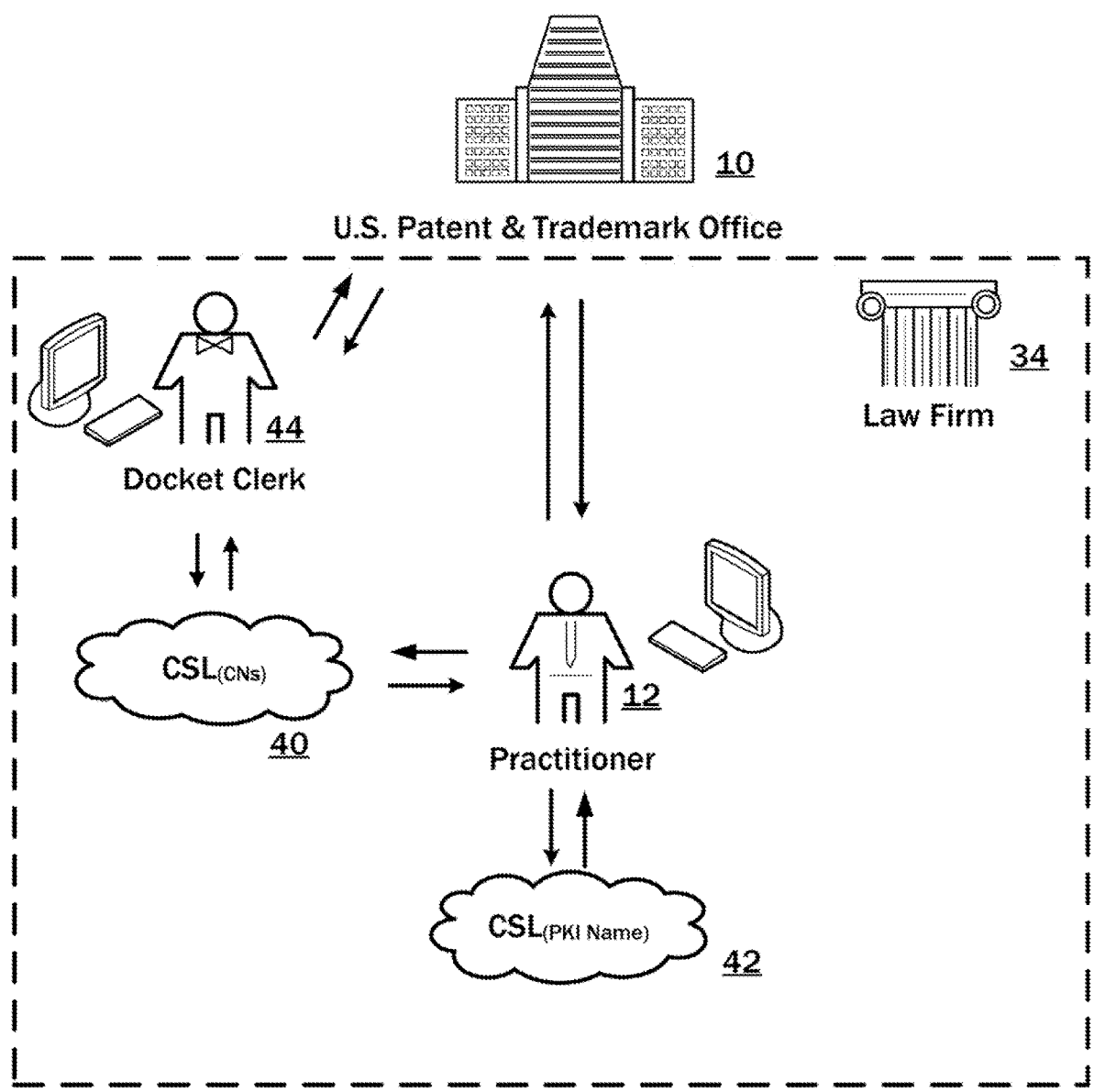
FIG. 3 is a schematic illustration of another system architecture.
Figure 3A:
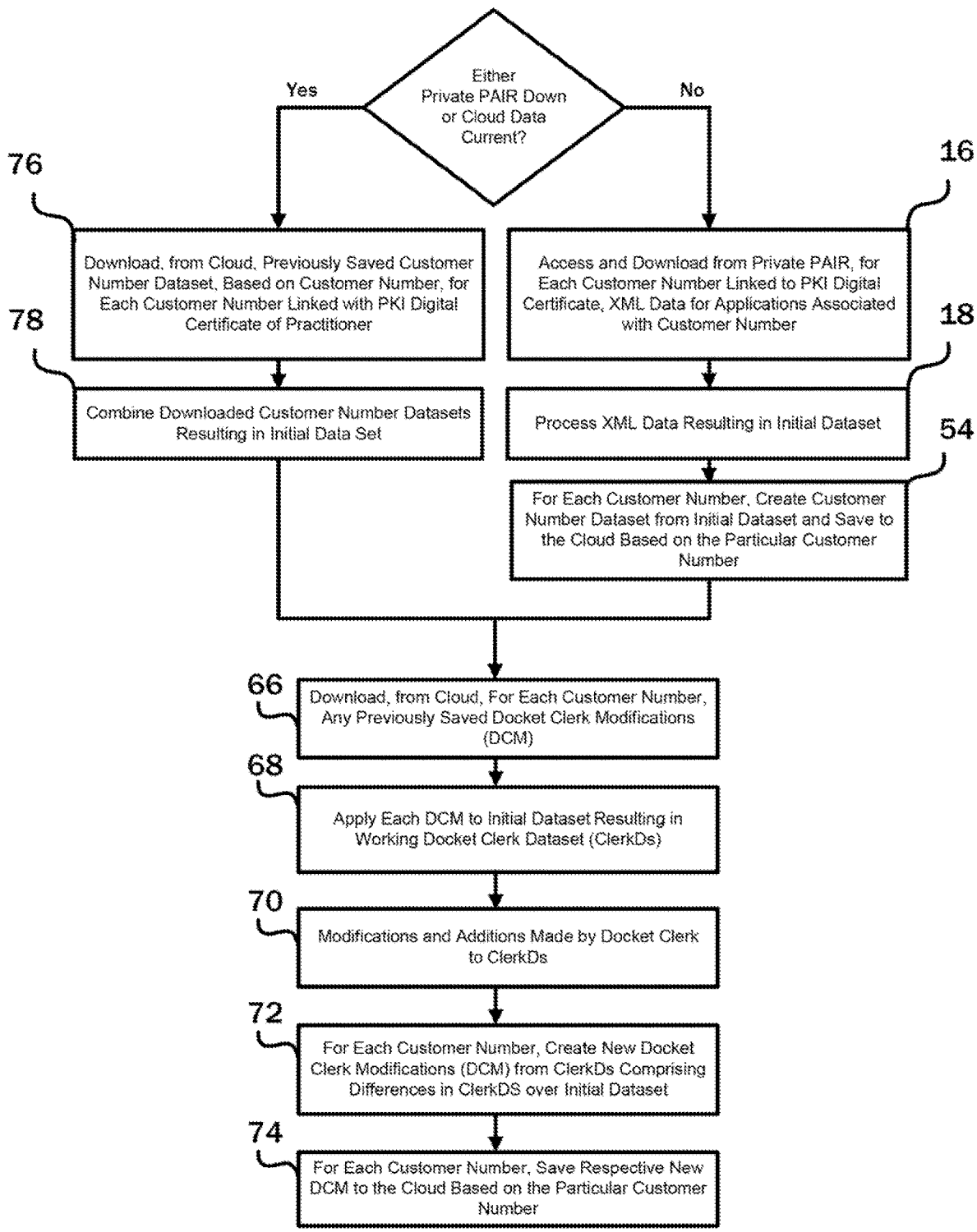
FIGS. 3a-b are flowcharts illustrating steps of one or more preferred embodiments in accordance with the system architecture of FIG. 3.

FIG. 3 is a schematic illustration of another system architecture and FIG. 3a is a flowchart illustrating steps of one or more preferred embodiments in accordance with this system architecture. The system architecture of FIG. 3 is similar to that of FIG. 2, and only the differences are discussed herein, the foregoing description corresponding to FIGS. 2-2a applying to that of FIGS. 3-3a except where noted or where logic necessarily dictates otherwise.

In accordance with the system architecture of FIG. 3, the law firm 34 includes a docket clerk 44. The docket clerk utilizes the PKI digital certificate of the practitioner 12 for accessing Private PAIR and downloading the XML data for the patent properties associated with all of the customer numbers of the law firm 34 (with which the patent practitioner's PKI digital certificate presumably is associated). The XML data that is downloaded from each customer number is then processed 18, resulting in the initial dataset. As before, the initial dataset is then saved 54 by creating, for each customer number, a customer number dataset representing a subset of the initial dataset that includes all of the data associated with the patent properties associated with that particular customer number. Each customer number dataset then is saved to the cloud storage location and, in particular, to the first cloud storage $CSL_{(csn)}$ in the folder that corresponds to the particular customer number of the customer number dataset. Any currently existing customer number dataset in the first cloud storage may be overwritten during the save operation.

Provided there are no previous modifications or additions by the docket clerk that need to be accounted for (thus permitting steps 66 and 68 to be skipped in FIG. 3a), the initial dataset is used to generate and display reports to the docket clerk; to generate and send alerts and reports via email to the docket clerk, or other desired recipients; and to instantiate a docket of law firm 34.

On the other hand, there may be modifications or additions to the data of the initial dataset. In this respect, the docket clerk may desire to modify the data in the initial dataset after downloading—including updating, revising, and omitting data—or may desire to add data for use in reports, alerts, and docketing, such as data for new matters that are not reflected in the data downloaded from the USPTO. The docket clerk is able to modify and add 70 data via different graphical user interfaces, including the ability to add matters and to add reminders for specific matters. The modifications and additions are made to the in-memory dataset representing the initial dataset. The resulting in-memory dataset constitutes a working docket clerk dataset (ClerkDs), and the reports, alerts, and docket are all generated based on the ClerkDs rather than the initial dataset.

For each customer number, a docket clerk modifications (DCM) dataset is created 72 from the ClerkDs that comprises the differences in the ClerkDs over the initial dataset. The DCM for each customer number then is saved 74 to the first cloud storage in association with that customer number and, in particular, is saved in the folder that corresponds to the particular customer number. Any currently existing DCM for that customer number in the first cloud storage may be overwritten during the save operation.

It will be appreciated that the initial dataset is thereby maintained in a pristine form based on the XML data that is acquired from the USPTO, and the initial dataset is not altered by any modifications or additions that are be made by the docket clerk.

Furthermore, it will be appreciated that when net modifications and additions by the docket clerk have previously been saved to the first cloud storage, the net modifications and changes are downloaded 66 from the first cloud storage and applied 68 to the initial dataset that is created in order to create the ClerkDs for use in reports, alerts and docketing. Thus, steps 66 and 68 are not skipped when there is one or more DCMs.

It is believed that the data that is available for download via Private PAIR is updated daily, and that only one download per day is necessary. Consequently, it will be appreciated that if the XML data has been downloaded for the day, and if the ClerkDs needs to be constructed for reports, alerts and docketing, then the ClerkDs can be constructed by downloading 62 the previously saved customer number datasets from the first cloud storage and combining 64 them to form the initial dataset, thereby avoiding any need to access Private PAIR and again download the XML data from the USPTO for all of the customer numbers. Accordingly, a check may be performed before initiating XML data downloading form the USPTO, and the download may occur if the XML data has not yet been downloaded for the day and the XML data is needed. However, if the check indicates that the XML data has already been downloaded for the particular day, then no download from the USPTO is initiated, and the customer number datasets already created from the XML data that has been downloaded for that particular day is read from the first cloud storage for constructing the ClerkDs.

The check may include maintaining a timestamp for each XML download associated with a customer number and deeming any download occurring after a preset time as having obtained, for that day and for that customer number, the most recent XML data available for that customer number.

The ability to construct the ClerkDs from the customer number datasets after the XML data has been downloaded from the USPTO on a particular day can be particularly beneficial, as the downloading of the XML data from the USPTO may take an appreciable amount of time that may be noticeable to a user seeking to work with and waiting for the ClerkDs to be constructed. Additionally, if Private PAIR is down or otherwise unavailable, the ClerkDs still can be constructed for reports, alerts and docketing by using the most recently saved customer number datasets and DCMs. This ability to read and construct the ClerkDs from the data saved to the first cloud storage under such scenarios is reflected in the flowchart of FIG. 3a.

The practitioner 12 also has the ability to work with reports, alerts and docketing.

Figure 3B:
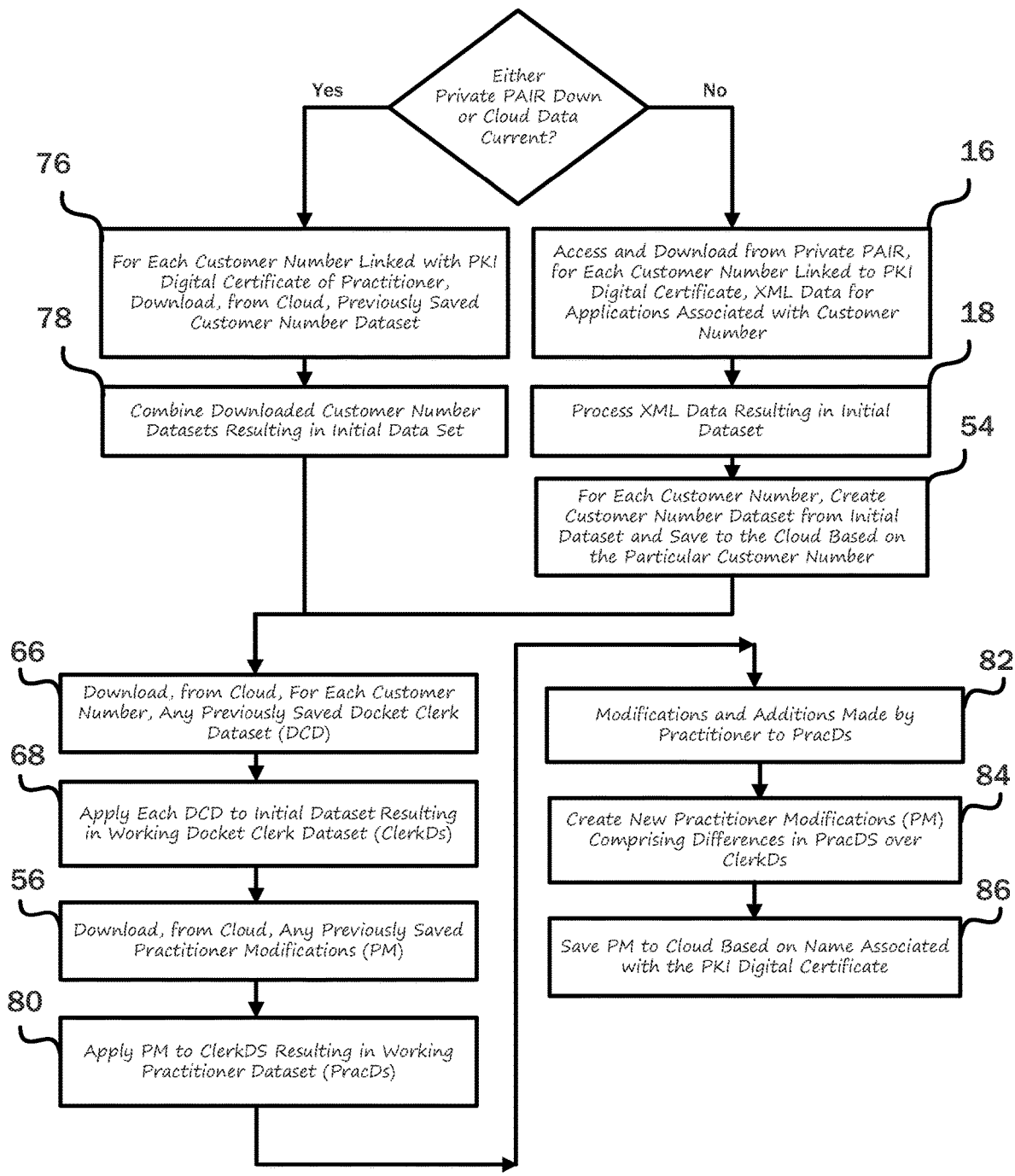

In this respect, and with reference now to FIG. 3b, the practitioner 62 downloads the previously saved customer number datasets from the first cloud storage and combines 64 them to form the initial dataset. Next, for each customer number, any associated DCM is downloaded 76 and applied 78 to the initial dataset, resulting in the ClerkDs. The practitioner modifications (PM) dataset, if any, then is downloaded 56 from the second cloud storage and applied 80 to the ClerkDs, resulting in the Practitioner Dataset (PracDs).

The practitioner, in working with reports, alerts or docketing, may desire to modify the data in the PracDs—including updating, revising, and omitting data—or may desire to add data for use in reports, alerts, and docketing, such as data for new matters that are not reflected in the ClerkDs. The practitioner is able to modify and add 82 data via different graphical user interfaces, including the ability to add matters and to add reminders for specific matters. The modifications and additions are made to the in-memory dataset representing the PracDs. Thereafter, when the practitioner is finished working with the reports, alerts, or docketing, a new practitioners modifications (PM) dataset is created 84 from the PracDs representing the differences in the PracDs over the ClerkDs. The new PM then is saved 86 to the second cloud storage.

It will be appreciated that the data may be filtered when generating reports, alerts or instantiating a docket so that only those patent properties of particular interest are included. Alternatively, such filtering may be performed when the ClerkDs or PracDs is created by the practitioner.

It will further be appreciated that the initial dataset and the ClerkDs is not altered by any actions of the practitioner. Indeed, the ClerkDs is constructed from the XML data download from the USPTO and the net modifications and additions made by the docket clerk. No action by the practitioner affects this data. ON the other hand, the PracDs is modified by the practitioner, whereby the practitioner may thus customize the data to his or her own purposes without affecting the data used by the docket clerk as well as other in the firm. As such, the reports, alerts and docketing provided for each respective practitioner are personal to—and within the individual control of—that practitioner.

Finally, with additional reference to FIGS. 3 and 3b, it will be appreciated that if the docket clerk does not download the XML data for a particular day before the practitioner runs his or her program, and if Private PAIR is available and is not down, then the practitioner will—at least for that day—access and download 16 the XML data from the USPTO, process the data 18, and create and save 54 the customer number datasets to the first cloud storage location.

A Fourth System Architecture

One or more preferred embodiments of the present invention are now described in connection with FIG. 4.

Figure 4:
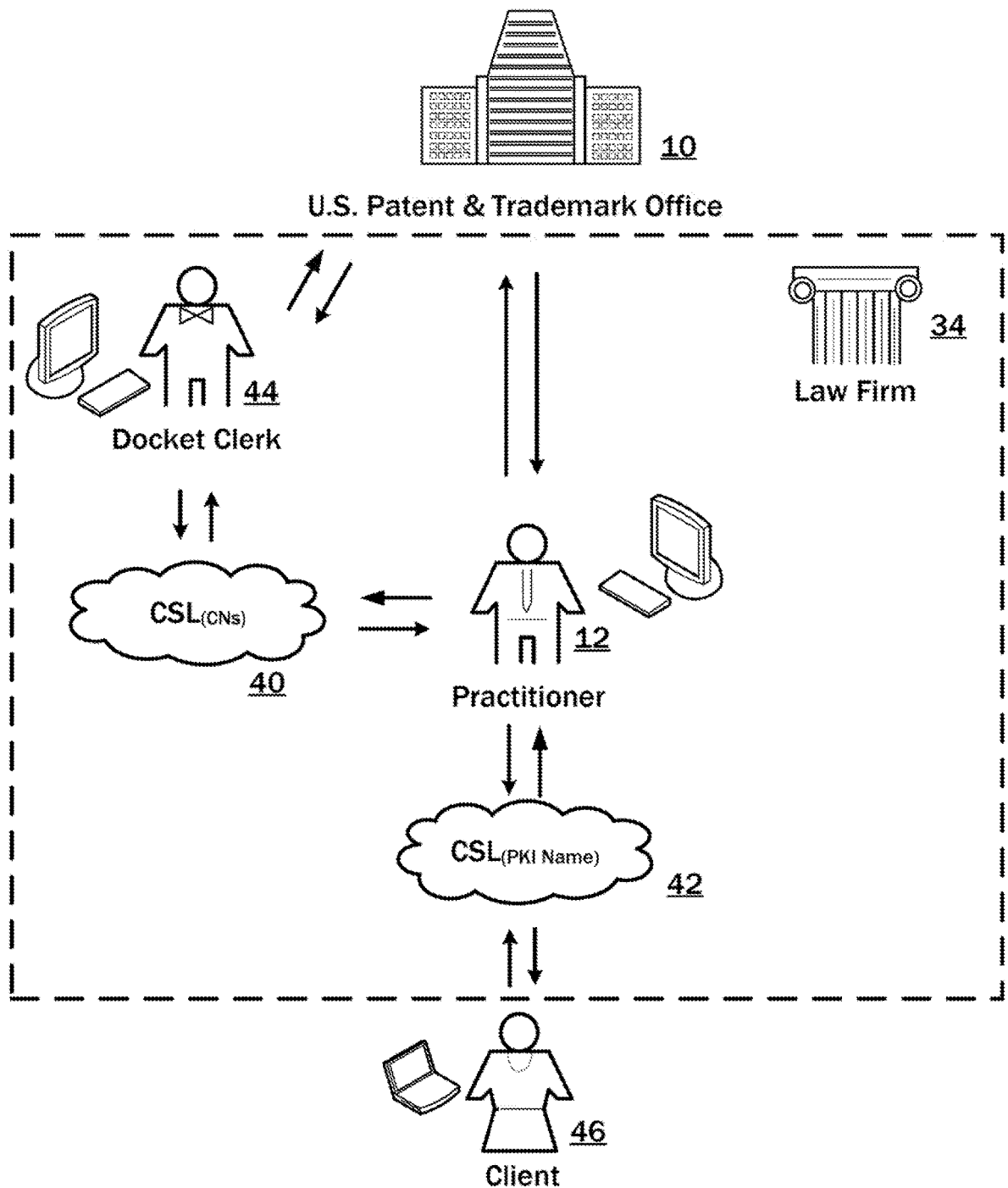
FIG. 4 is a schematic illustration of another system architecture.

FIG. 4 is a schematic illustration of another system architecture. The system architecture of FIG. 4 is similar to that of FIG. 3, and only the differences are discussed herein, the foregoing description corresponding to FIGS. 3-3a applying to that of FIG. 4 except where noted or where logic necessarily dictates otherwise.

In accordance with the system architecture of FIG. 4, a client 46 of the law firm 34 has access to data regarding that client's patent properties for generating reports, email alerts, docketing, or combination thereof. Access by the client to the data is enabled by providing the client a program that is configured to download, from the second cloud storage 42 and, specifically, from the folder associated with the practitioner representing the client, a dataset comprising that client's data. The client dataset is saved with the filename of the client reference used by the law firm, which is presumably a unique identifier of the client. The client dataset is created from the PracDs and includes any modifications or additions made by the practitioner, as well as any modifications or additions made upstream of the practitioner by the docket clerk.

Moreover, the client dataset includes the latest XML data as programmatically downloaded from the USPTO. Indeed, in order to insure that the data is current as of the day, the program used by the practitioner and the program used by the docket clerk preferably run at least once each day for at least the purpose of updating the XML data that is downloaded from the USPTO and updating the client dataset that is available for access by the client.

An authentication system preferably is used to authenticate the client before the client dataset is downloaded. One authentication system maintains an association between the practitioner name, the client reference, and a password. When the client program is run, the client enters the practitioner name, client reference, and password. The program then looks to the credentials list in the second cloud storage that corresponds to the practitioner name, looks up the client reference in the credentials list, and compares the password associated with the client reference in the list to the password entered by the client. If the passwords match, then the client dataset corresponding to the client reference is downloaded from the that respective practitioner folder.

The client references and password in the credentials list preferably are maintained by the practitioner through one or more graphical user interfaces of the program used by the practitioner.

It will be appreciated that using the program, the client is able to programmatically monitor information about that client's patent properties using the most current data, all without having to manually contact the practitioner or law firm. Indeed, the information available to the client is as current as the information that is available to the practitioner. Moreover, the information is programmatically provided without the client having access to the practitioner's PKI digital certificate or associated password.

Software Implementation With Client Patent Reporting

A software implementation in which clients are provided means for generating reports from client datasets can be found in the computer program listing, which is incorporated herein by reference. Specifically, the Patent Reporter™ enables a client to enter a client reference and associated password and, upon authentication, download that client's data and view reports that are generated with the data. The credentials list that is used in with the patent reporter is maintained by a practitioner as a feature of the Searchlight™ program, previously referenced hereinabove.

A Fifth System Architecture

One or more preferred embodiments of the present invention are now described in connection with FIG. 5.

Figure 5:
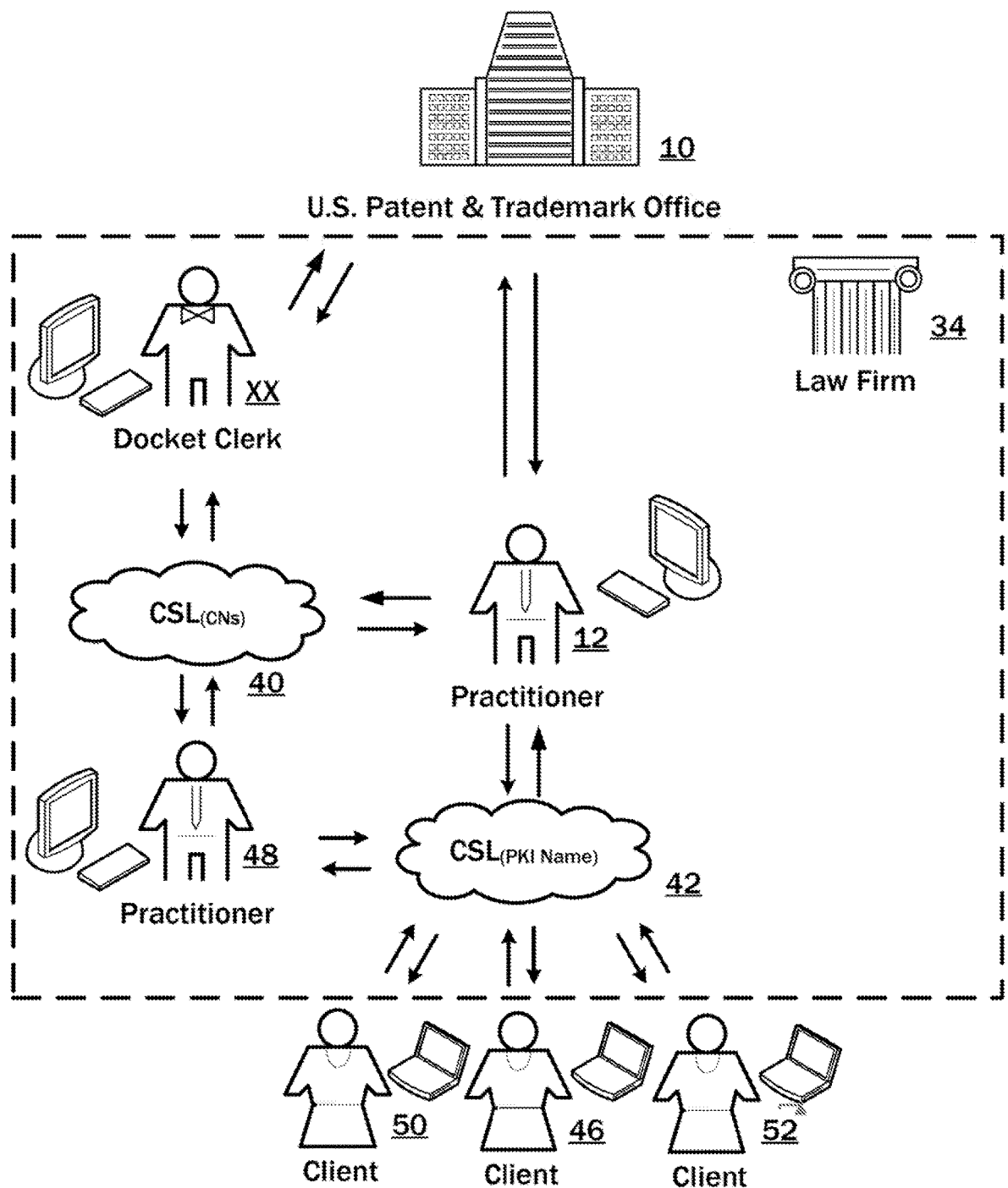
FIG. 5 is a schematic illustration of another system architecture.

FIG. 5 is a schematic illustration of another system architecture. The system architecture of FIG. 5 is similar to that of FIG. 4, and only the differences are discussed herein, the foregoing description corresponding to FIG. 4 applying to that of FIG. 5 except where noted or where logic necessarily dictates otherwise.

In accordance with the system architecture of FIG. 5, multiple practitioners 12,48 are explicitly shown as accessing the first cloud storage for generating and working with reports, email and docketing. Moreover, each practitioner 12,48 saves his or her practitioner modifications (PM) dataset to the second cloud storage, as well as saves respective client datasets and credential list to the second cloud storage 42. Each practitioner may provide a different client access to his or her client dataset. Thus, for example, practitioner 12 provides client 46 with access to that client's dataset in that practitioner's folder in the second cloud storage 42; similarly, practitioner 48 provides client 50 with access to that client's dataset in that the folder of practitioner 48 in the second cloud storage 42. In addition thereto, each practitioner 12,48 may provide a respective client dataset generated from that practitioner's PracDs to the same client 52. The client 52 thus may generate and work with reports, email, and docketing using either client dataset, as desired, by entering the particular practitioner's name, the client reference (presumably the same for both practitioners), and the password established by the respective practitioner. While this may seem at first duplicitous, this dichotomy can work well when different practitioners are working on different groups of cases, especially for a large corporate client with many patent properties; and when the client is a corporate client with multiple client contacts and each desires to work with reports, email, and docketing for a selected group of patent properties of particular interest to that client contact.

A Sixth System Architecture

One or more preferred embodiments of the present invention are now described in connection with FIG. 6.

Figure 6:
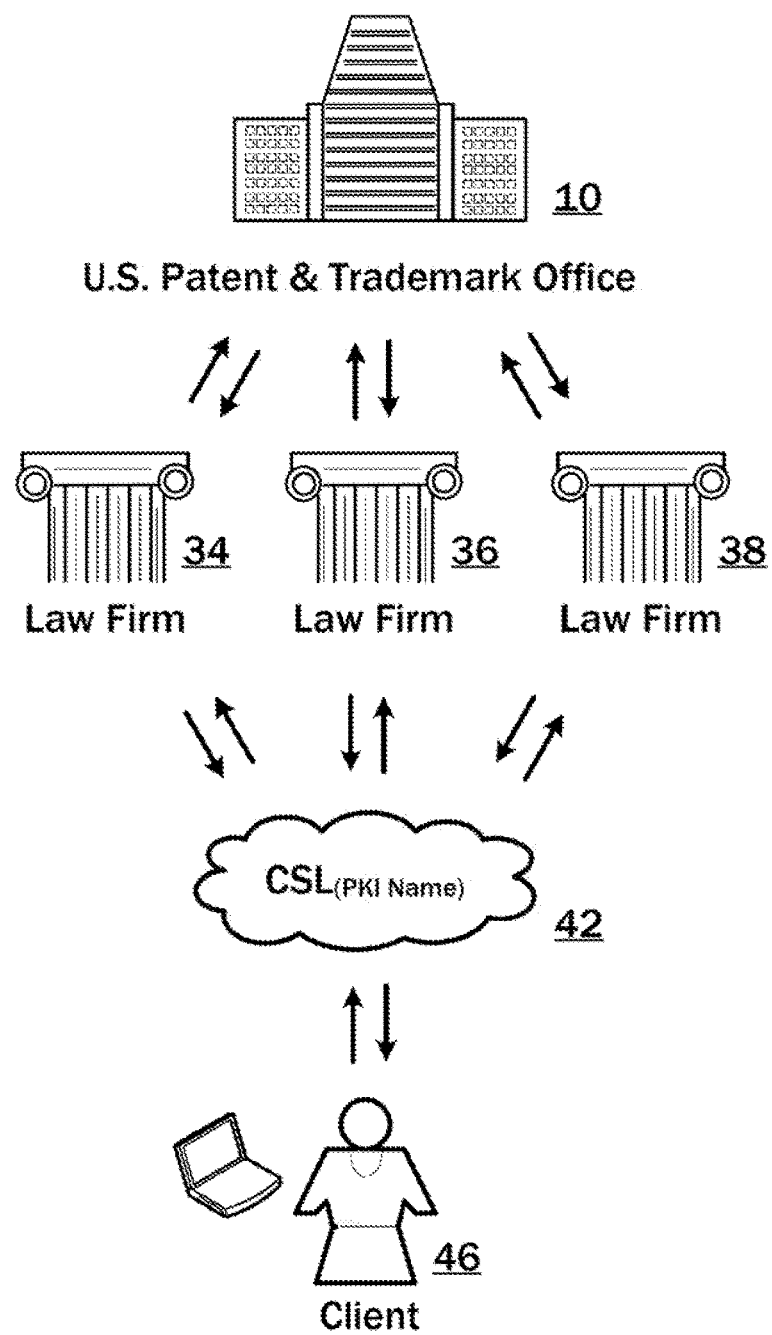
FIG. 6 is a schematic illustration of another system architecture.

FIG. 6 is a schematic illustration of another system architecture. The system architecture of FIG. 6 is similar to that of FIG. 4, and only the differences are discussed herein, the foregoing description corresponding to FIG. 4 applying to that of FIG. 6 except where noted or where logic necessarily dictates otherwise.

In accordance with the system architecture of FIG. 6, multiple law firms 34,36,38 are explicitly shown as working with a common client 46, which is not unusual when the client is a large corporate client. The client 46 has been given access by a practitioner at each law firm to that respective practitioner's folder in the second cloud storage 42, whereby the client can download that client's respective dataset from each law firm. In the preferred embodiments in this system, the client program combines the client datasets into a single dataset for working with reports, email and docketing. The client 46 is thereby provided a complete and consolidated view of that client's patent properties that are maintained by multiple law firms, with data that is the most current available, even to the practitioners of the client.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for automatically generating a personal docket at a personal computer of a user, the method comprising:
   (a) automatically downloading, by software running on a personal computer of the user, from an online computer system of the U.S. Patent and Trademark Office, one or more data files containing data relating to patent properties that are associated with the user, the data including correspondence, status, and transaction information for the patent properties;
   (b) automatically deriving from the downloaded data, by the software running on the personal computer of the user, a plurality of reminders for the patent properties by calculating a plurality of deadlines for the patent properties using the downloaded data;
   (c) automatically downloading, by the software running on the personal computer of the user, from a remote cloud repository, user data comprising previous user modifications associated with the user, the previous user modifications relating to one or more of the automatically derived reminders for the patent properties;
   (d) automatically combining, by the software running on the personal computer of the user, in memory of the personal computer, the plurality of reminders for the patent properties that were derived from the data downloaded from the online computer system of the U.S. Patent and Trademark Office with the user data that was downloaded from the remote cloud repository to form an in-memory personal docket of reminders for the user;
   (e) displaying, via a display associated with the personal computer of the user, one or more reminders of the personal docket of reminders for the user;
   (f) receiving input, by the software running on the personal computer of the user, the input representing a user modification relating to a displayed reminder;
   (g) automatically saving, by the software running on the personal computer of the user, to the remote cloud repository, the user data relating to the displayed reminder;
   whereby each time the method is performed, a new instance of an in-memory personal docket of reminders for the user is formed on a personal computer of the user.

* * * * *